UNITED STATES PATENT OFFICE.

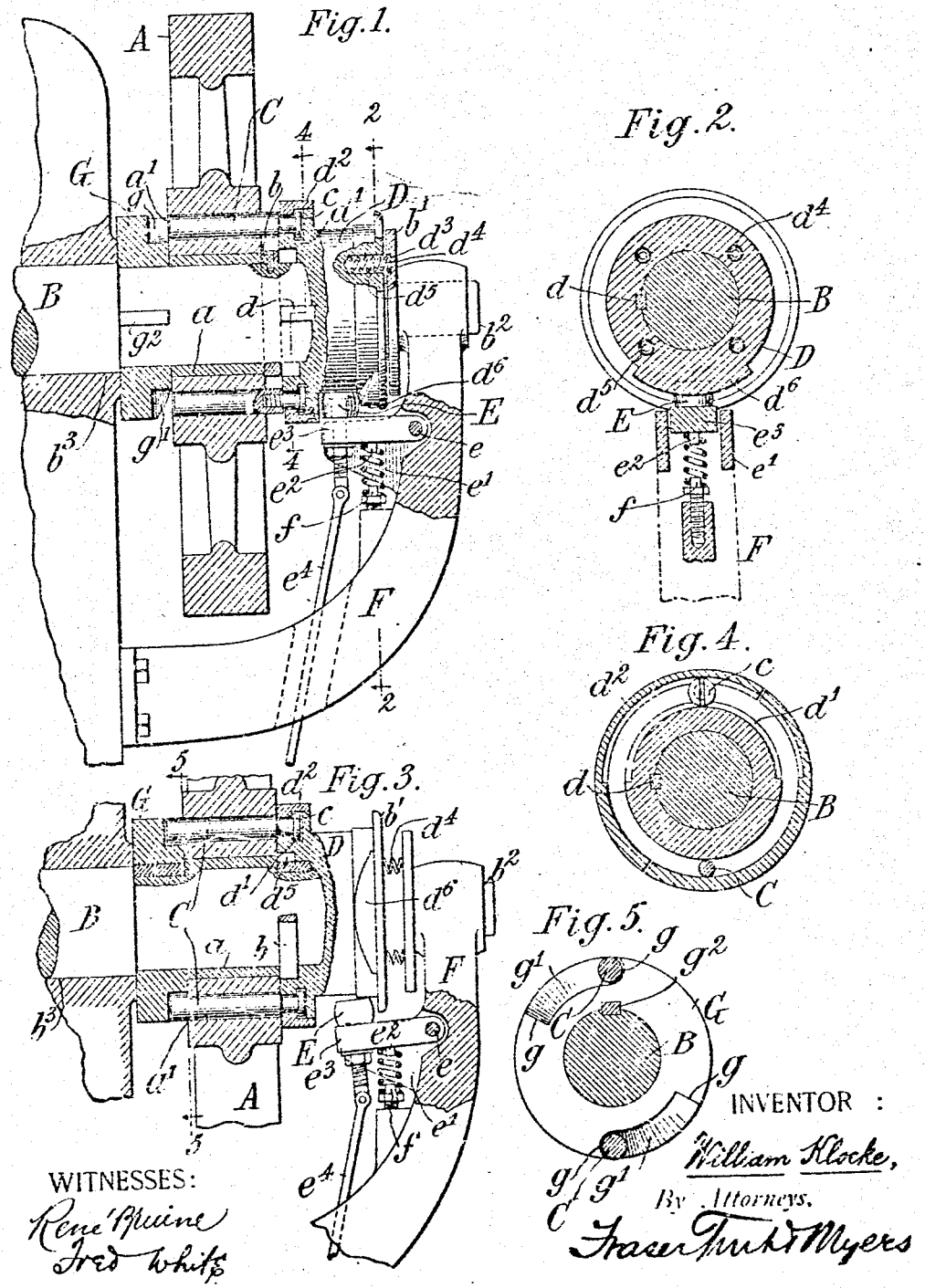

WILLIAM KLOCKE, OF NEW YORK, N. Y., ASSIGNOR TO E. W. BLISS COMPANY, OF BROOKLYN, NEW YORK, A CORPORATION OF WEST VIRGINIA.

AUTOMATIC CLUTCH.

991,785.  Specification of Letters Patent.  Patented May 9, 1911.

Application filed July 12, 1910. Serial No. 571,599.

*To all whom it may concern:*

Be it known that I, WILLIAM KLOCKE, a citizen of the United States, residing in the borough of Brooklyn, county of Kings, city and State of New York, have invented certain new and useful Improvements in Automatic Clutches, of which the following is a specification.

My invention relates to clutches for automatically connecting or disconnecting a machine from its driving mechanism, and while I have shown it in connection with pin clutches to which it is particularly well adapted, it may also be found useful in connection with clutches of other kinds.

It has for its object to provide a clutch which will be simple and efficient, certain in operation, will not become broken while being connected or disconnected, and is adapted particularly to drawing, punching and stamping presses, and which will be found to be capable of use in such machines when operating at a higher rate of speed than any clutches with which I am familiar, to wit, my improved clutch may be used in such machines when operating at as high a rate of speed as 125 to 150 revolutions per minute, which is a high speed for this class of machinery. This I attain by the use of the mechanism hereinafter described and fully illustrated in the accompanying drawings, which embodies one form in which my invention may be used.

In the drawings,—Figure 1 is a sectional elevation of a portion of a machine illustrating my invention; Fig. 2 is a transverse section on the line 2—2 (Fig. 1) looking to the left; Fig. 3 is a view of some of the parts illustrated in Fig. 1, the clutches being coupled; Fig. 4 is a transverse section on the line 4—4 of Fig. 1, looking to the left; Fig. 5 is a detail section on the line 5—5 of Fig. 3, looking to the left, illustrating the pin abutments.

In the form illustrated my improved clutch employs a driven shaft having a driving wheel freely mounted thereon, a plurality of clutch pins movable axially in said wheel, a collar fixed to the shaft on one side of said wheel to which said pins may be clutched, and contrived to permit said clutches to engage while traveling at a high rate of speed, and a sliding collar on the shaft on the other side of said wheel for controlling the pins, and means for moving said sliding collar for coupling and uncoupling.

The driving wheel A is normally free to rotate on the shaft B which is journaled at $b^2$ in an arm F and at $b^3$ in the frame of the machine, and said wheel has bearing on a sleeve $a$ on said shaft. This wheel A is illustrated as perforated axially, as at $a^1$, for the reception of the clutch pins C, which are mounted to slide in said perforations, and on one end may have means for connecting them to a clutch operating device. Such means as illustrated are heads $c$ which are received in a clutch operating member D. The clutch pins C are illustrated as round but are not necessarily of that shape. They are preferably formed of hardened steel and are easily removable to substitute others when they become worn.

The clutch operating member D as illustrated, is in the form of a collar which is keyed on the shaft B by a key $d$, and has a circumferential groove $d^1$ for receiving the heads $c$ of the clutch pins. If desired an annular band $d^2$ may be secured upon the periphery of the collar D in such manner as to inclose the groove and pins $c$, and this is preferably made removable as by splitting to facilitate the removal of the pins. The circumferential groove referred to, $d^1$, extends entirely about the collar D, and will permit the heads $c$ of the pins to revolve freely therein, at the same time controlling the axial movement thereof. If desired a band or collar $b$ may be suitably secured to the shaft B for the purpose of holding the wheel A against movement thereon, and if employed a groove $d^3$ may be cut upon the inner side of the collar D to pass over the same.

The pin operating collar D is spring impelled normally to its operative or coupling position by coiled springs $d^4$, which are received in axial recesses $d^5$, and at their outer ends bear against corresponding recesses in a plate $b^1$ which is fixed at the end of the shaft B. Suitable means may be employed to move the sliding clutch collar, such means as illustrated comprising a rotary cam $d^5$ upon the periphery of the collar D by means of which the said collar may be withdrawn from its operative or clutching position through contact with a movable trip E. This trip is pivoted at $e$ to the frame F of the machine. A coiled spring $e^1$ encircles a small stud $f$ upon the frame F, as well as a small lug $e^2$ upon the arm $e^3$ which carries the trip and normally presses the trip to position in the path of the cam $d^5$, where upon the rotation of the collar D the said trip will engage the beveled face of said cam, and riding upon the top thereof will force the cam back, withdrawing the pins from operative position. A link $e^4$ is attached to the trip and may be connected to a suitable treadle for the purpose of withdrawing the trip when desired, and the usual means may be provided for holding this treadle down.

When the clutch pins C are thrust to the left in Fig. 1, they come in the path of stop shoulders or abutments $g$ upon a collar G that is fixed to the shaft B so as to revolve therewith. This collar is immovable on the shaft and may provide one of the means for holding the driving wheel A in position. Upon its operative face it is illustrated as having two abutments $g$ against which the pins C bear. The entrance to these abutments is preferably sloping or inclined, as at $g^1$, for the purpose of facilitating the passage of the pins when the driving wheel carrying the same is operating at considerable speed as the pins ride down such incline and have an easy and gradual entrance and hammering is prevented. A key $g^2$ (Fig. 5) holds the collar in place on the shaft B.

For the purpose of easing the shock produced by the axial thrust when the pins are moved to coupling position, I regard the said inclined entrance as important in that it insures that the clutch pins will engage the said abutments even when the said pins are traveling at the high rate of speed mentioned, and that they will do so easily and without shock.

I have illustrated the employment of two sliding clutch pins and corresponding abutments which are oppositely disposed, and regard it as important that at least two of such pins and abutments should be employed, and that they should be disposed so that the strain shall be borne upon opposite sides of the driving wheel. Thereby the balance of said wheel is maintained and uneven wear thereof or of the bearing is prevented, and this I regard as important.

I have here illustrated and described a practical application of my improved clutch, but I do not regard the same as necessarily confined within the limits of the particular mechanism illustrated, as various equivalents might be used for many of the elements illustrated, and the same might be modified or changed to suit particular requirements, without departing from the essential spirit of the invention.

I claim as my invention:—

1. In combination, a shaft, a wheel freely mounted thereon, a collar fixed on said shaft and engaging said wheel to prevent its axial movement in one direction, an axially movable clutch pin carried by said wheel, a corresponding abutment on said collar, means for easing the axial thrust in coupling comprising an inclined entrance to said abutment, and means for actuating said pins.

2. In combination a driven shaft, a driving wheel freely mounted thereon, a collar fixed on said shaft and engaging said wheel to prevent its axial movement in one direction, axially movable clutch pins carried by said wheel and substantially oppositely disposed so as to balance the strain upon said wheel, corresponding abutments upon said collar, means for easing the axial thrust comprising an inclined entrance to each abutment, and means for actuating said pins.

3. In combination a driven shaft, a driving wheel freely mounted thereon, a collar fixed on said shaft, a headed clutch pin carried by said wheel and axially movable therein, a corresponding abutment upon said collar, means for easing the axial thrust in coupling comprising an inclined entrance to said abutment, a pin controlling collar fixed to rotate with said shaft but free to slide axially thereof, and means connecting said pin head to said sliding collar which permit the pin head to revolve in said collar and to move axially therewith.

4. In combination, a driven shaft, a driving wheel freely mounted thereon, a collar fixed on said shaft, a plurality of headed clutch pins carried by said wheel and axially movable therein and disposed substantially oppositely so as to balance the strain upon the wheel, corresponding abutments upon the collar, and means for easing the axial thrust in coupling comprising inclined entrances to said abutments, a pin controlling collar mounted upon said shaft to slide thereon and to turn therewith, a circumferential groove upon said sliding collar adapted to receive the head of said pins and to move the same axially, and permitting the said pins to revolve about said sliding collar.

5. In combination a shaft, a wheel turning freely thereon, a collar fixed thereto and holding said wheel against axial movement in one direction, and a band upon said shaft holding the said wheel from axial movement in the other direction, relatively movable clutch members upon said wheel and collar comprising axially movable pins upon one part and corresponding abutments upon the other.

6. In an automatic clutch, a driven shaft, clutch members comprising a collar fixed on said shaft, a driving wheel freely mounted thereon, an axially movable clutch pin carried in an axial hole in said driving wheel and removable therefrom, an abutment therefor on said collar having an inclined entrance, and a collar mounted to slide on said shaft and rotatable around said clutch pin but adapted to move the same into and out of engagement with said abutment as said collar is moved axially of the shaft.

7. In combination, a shaft, a wheel normally free thereon, clutch members adapted to connect said shaft and wheel comprising a headed pin clutch carried by said wheel and a coöperating abutment having an inclined entrance fixed to the shaft, a clutch operating collar movable axially on said shaft having a circumferential groove for receiving the head of said pin, a rotary cam on said collar, and a trip movable into position to engage said cam and disconnect said clutch.

8. In combination, a shaft, a wheel normally free thereon, clutch members adapted to connect said shaft and wheel comprising a plurality of oppositely disposed headed pin clutches carried by said wheel and coöperating abutments having inclined entrances fixed to the shaft, a clutch operating collar axially movable on said shaft having a circumferential groove adapted to receive the heads of said pins, a spring normally pressing said collar to position to engage said clutch, a rotary cam on said collar, and a trip adapted to be moved into the path of said cam and to uncouple said clutch.

9. In combination, a main shaft, a driving wheel freely mounted thereon, pin clutches for connecting said wheel and shaft and adjustable axially thereof, and carried by said wheel, a collar fixed on said shaft having abutments adapted to receive said pins, a sliding clutch-operating collar keyed on said shaft, a connection between said pins and said sliding collar whereby said pins are adjusted by said collar but may revolve free thereof, a cam on said sliding collar, and a trip movable out of the path of said cam, and adapted when in the path of said cam to disconnect the pin clutch.

10. The combination of a shaft, pin clutches, a clutch operating collar keyed on said shaft and movable axially thereof, a cam surface on said collar, a trip spring pressed toward said cam and adapted to disconnect said clutch mechanism in such position and movable downwardly out of the path thereof, and means for causing said collar to set the pin clutches to operative position when the trip is withdrawn from the path of the cam.

11. In combination, a shaft, a driving wheel thereon, means for clutching same to said shaft comprising pin clutches carried by and movable transversely of said driving wheel, a collar on said shaft having abutments to receive said pins, and a collar fixed to revolve with the shaft but movable axially thereof and connected to said pin clutches so as to move the same, a cam on said collar, and a trip spring pressed into the path of said cam and adapted when in position to cause the collar to withdraw the pins from operative position and to disconnect said clutch.

12. In combination, a driving wheel, a shaft, a coupling fixed on said shaft, oppositely disposed clutch pins movable axially in said driving wheel, coöperating abutments on said fixed collar having inclined entrances, a sliding collar keyed on said shaft, a connection between said sliding collar and said pins whereby the pins are adapted to be moved axially by said collar, but are free to revolve thereon, a cam on said collar, and a trip spring pressed into the path of said cam and adapted in such position to uncouple said clutch.

13. In combination, a shaft and a wheel normally free to rotate thereon, clutch pins carried by said wheel and movable axially thereof and removable therefrom, fixed abutments therefor on said shaft, and inclined entrances to said abutments, and a collar mounted to slide on said shaft and rotatable around said clutch pins but adapted to move the same into and out of engagement with said abutments as said collar is moved axially of the shaft.

14. In combination, a shaft and a wheel normally free to revolve thereon, oppositely disposed clutch members comprising pins carried by said wheel and adapted to be moved axially thereof, a coöperating abutment fixed on said shaft at one side of said wheel having inclined entrances, and a clutch operating member keyed on said shaft so as to revolve therewith but to move axially thereof at the other side of said wheel, a connection between said pins and said clutch operating member for moving said pins axially but permitting said clutch operating member to turn free of said pins, and automatic means for moving said clutch operating member into and out of coupling position.

15. In combination, a shaft and a wheel normally free to revolve thereon, oppositely disposed headed clutch pins carried by said wheel and free to move axially thereof, a collar fixed on said shaft having abutments with inclined entrances, a pin operating collar keyed on said shaft so as to turn therewith but to move axially thereon, a circumferential groove therein adapted to receive the head of said pin, a spring normally pressing said collar toward said clutch, a rotary cam on said collar, and a trip normally spring impelled toward said cam, and means for withdrawing said trip.

In witness whereof, I have hereunto signed my name in the presence of two subscribing witnesses.

WILLIAM KLOCK

Witnesses:
CHARLES EDWIN POLLARD,
CHAS. J. ELLSWORTH.